Patented Jan. 24, 1933

1,895,101

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

VAT DYESTUFF OF THE ANTHRAQUINONE SERIES

No Drawing. Application filed August 22, 1929, Serial No. 387,799, and in Germany October 20, 1928.

The present invention relates to the production of vat dyestuffs.

We have found that very valuable new vat dyestuffs, having the general formula

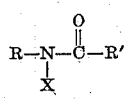

in which R represents a dibenzanthrone or isodibenzanthrone radicle which may be substituted, X a hydrogen atom or a hydrocarbon radicle for example an alkyl or acyl group, and R'—CO— a radicle of a polynuclear carboxylic acid, are obtained by condensing dibenzanthrones or isodibenzanthrones which contain nitrogen and which possess at least one replaceable hydrogen atom attached to a nitrogen atom with halogenides, anhydrides or esters of polynuclear carboxylic acids for example with the anthraquinone carboxylic acids or the carboxylic acids of the benzanthrone, perylene, pyranthrone, anthanthrone, dibenzopyrenequinone, or ms-anthradianthrone series and the like. The same new vat dyestuffs are also obtained by condensing dibenzanthrones or isodibenzanthrones containing halogen atoms or other negative substituents with amides or imides of the said polynuclear carboxylic acids. The method has been found particularly advantageous for the manufacture of dibenzanthrones or isodibenzanthrones which are substituted several times by acid amide residues. The treatment is best carried out in an organic suspension or dissolving medium of high boiling point, such as for instance nitrobenzene, nitrotoluene, naphthalene and the like, and preferably with the aid of condensing catalysts, for instance metals, such as copper, mercury and the like, or salts or oxides thereof and in the presence, if desired, of agents capable of combining with acids, for example the alkali metal salts of weak acids, such as sodium acetate.

The dyestuffs which are obtained in very good yields and in a state of great purity, dye cotton in violet, blue, green to black shades. The derivatives of dibenzanthrone dissolve in concentrated sulphuric acid usually giving a violet colouration, and the derivatives of isodibenzanthrone dissolve usually giving a green colouration. The colour of the vats is usually blue or blue violet.

The crude dyestuffs obtained by the condensation may be purified if necessary by crystallization from solvents of high boiling point, or by fractional precipitation from concentrated sulphuric acid, or by treatment in the form of pastes with oxidizing agents, for example sodium hypochlorite.

The following examples will further illustrate the nature of this invention, but the invention is not restricted to these examples. The parts are by weight.

Example 1

A suspension of 47 parts of mono-amino dibenzanthrone, prepared for example by reduction of mononitro dibenzanthrone, which is obtainable by the nitration of pure dibenzanthrone in nitrobenzene with nitric acid, and 32 parts of 1-chlor anthraquinone-2-carboxylic acid chloride is 1000 parts of nitrobenzene is slowly heated to boiling while stirring and maintained at the boiling point until unchanged amino dibenzanthrone can no longer be detected. The isolation of the dyestuff formed which corresponds to the formula:

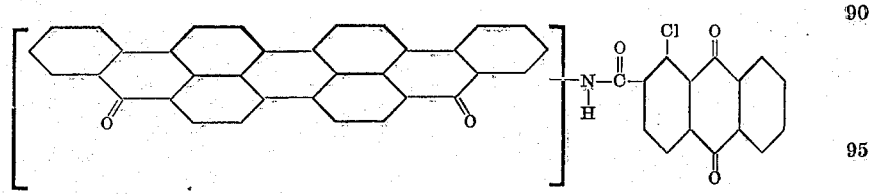

may be carried out by filtering off by suction or by distilling off the solvent, and in the latter case the distillation may be carried out if desired under reduced pressure or with steam. The dyestuff is a blue powder which dissolves in concentrated sulphuric acid giving a violet coloration and gives dark blue dyeings of excellent fastness on cotton from a blue violet vat.

By employing the corresponding quantity of anthraquinone-2-carboxylic acid chloride instead of the 1-chlor anthraquinone-2-carboxylic acid chloride, a dyestuff is obtained which has similar properties as regards fastness and dyeing behaviour.

*Example 2*

25 parts of 1-amino anthraquinone-2-carboxylic acid are suspended in 500 parts of nitrobenzene and converted into the acid chloride with 20 parts of thionyl chloride in the usual manner. After the excess thionyl chloride and any sulphur dioxide and hydrochloric acid present have been removed by blowing in air under reduced pressure, 40 parts of amino isodibenzanthrone prepared for example by reduction of nitro isodibenzanthrone which is obtainable by nitration of isodibenzanthrone in nitrobenzene with nitric acid, are added while stirring, the temperature is raised slowly up to from 180° to 200° centigrade and the whole kept at this temperature until the solution has a pure blue color. It is then worked up as described in Example 1. The dyestuff corresponding to the formula:

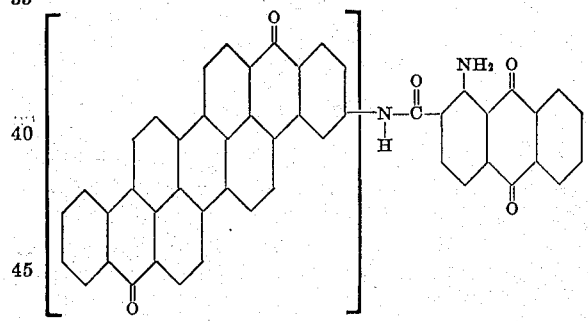

obtained, which is a blue powder, dissolves in concentrated sulphuric acid giving a green coloration, and gives powerful blue dyeings on the vegetable fibre from a blue vat, which dyeings, in contrast to the dyeings obtained with amino isodibenzanthrone, no longer change in color when moistened with water.

*Example 3*

470 parts of amino isodibenzanthrone, which may be prepared as described in Example 2, are suspended in 2000 parts of nitrobenzene, and after the addition of 320 parts of 1-chlor anthraquinone-2-carboxylic acid chloride are boiled while stirring, until unchanged initial material can no longer be detected. The whole is then worked up as described in Example 1. The dyestuff corresponding to the formula:

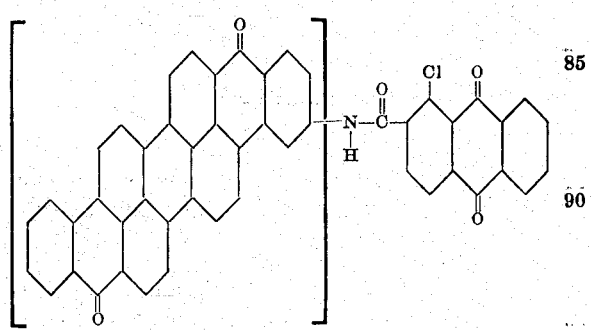

obtained, which is a blue powder, dissolves in concentrated sulphuric acid giving a green coloration and dyes cotton from a greenish blue vat blue shades of excellent fastness.

*Example 4*

54 parts of monobrom isodibenzanthrone, obtainable by brominating pure isodibenzanthrone in chloro-sulphonic acid in the presence of manganese at a temperature between 25° C. and 30° C. in 1000 parts of nitrobenzene are boiled while stirring together with 50 parts of sodium acetate, 15 parts of copper oxide and 20 parts of perylene tetracarboxylic acid diimide until the reaction product is practically free from bromine. The whole is then worked up in the usual manner. The dyestuff obtained corresponding to the formula:

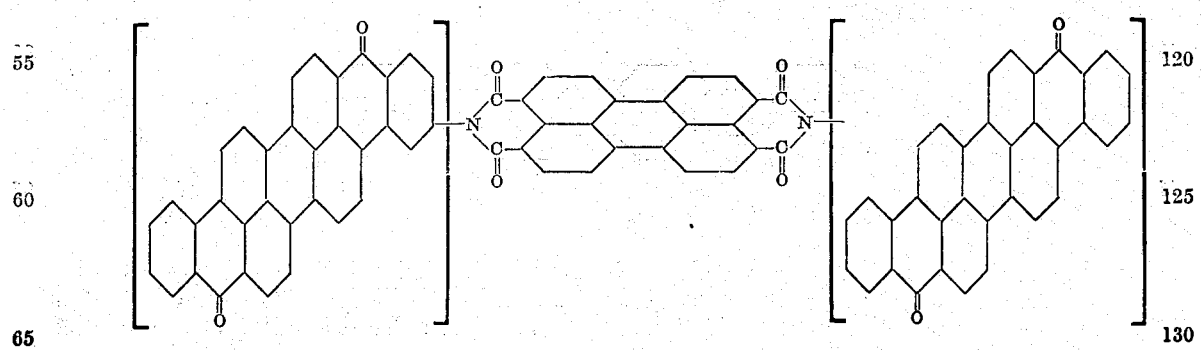

is a violet blue powder which dissolves in concentrated sulphuric acid giving a green colouration and which dyes cotton very fast violet shades from a blue vat. The crude dyestuff obtained may be purified if necessary by treatment in the form of an aqueous paste with oxidizing agents, for example sodium hypochlorite.

Example 5

78 parts of tetrabrom dibenzanthrone are boiled in 1000 parts of nitrobenzene while stirring after the addition of 50 parts of sodium acetate, 15 parts of copper oxide and 75 parts of 1-amino anthraquinone-2-carboxylic acid amide until the reaction is complete. The mass is allowed to cool and the dyestuff formed which corresponds to the formula:

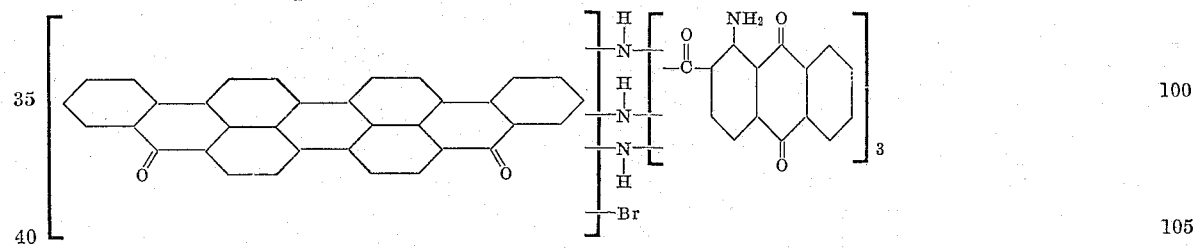

is filtered off by suction. It is a bluish black powder dissolving in concentrated sulphuric acid with a violet coloration and dyes cotton from a bluish green vat bluish green shades of excellent fastness.

In an analogous manner a blue dyestuff is obtained by condensing one molecular proportion of monobrom isodibenzanthrone with one molecular proportion of 1-amino anthraquinone-2-carboxylic acid amide.

Example 6

35 parts of anthanthrone-monocarboxylic acid (obtainable from monoamino anthanthrone by way of the diazonium compound with cuprous cyanide and saponification of the resulting nitrile) are stirred in 1000 parts of nitrobenzene with 30 parts of thionyl chloride at from 100° to 110° C. until the formation of the anthanthrone carboxylic acid chloride is complete. Thereafter 47 parts of monoamino isodibenzanthrone are added, the mass is heated to from 180° to 200° C. and kept at this temperature until all of the acid chloride is consumed. The reaction product is worked up in the usual manner. The dyestuff obtained corresponding to the formula:

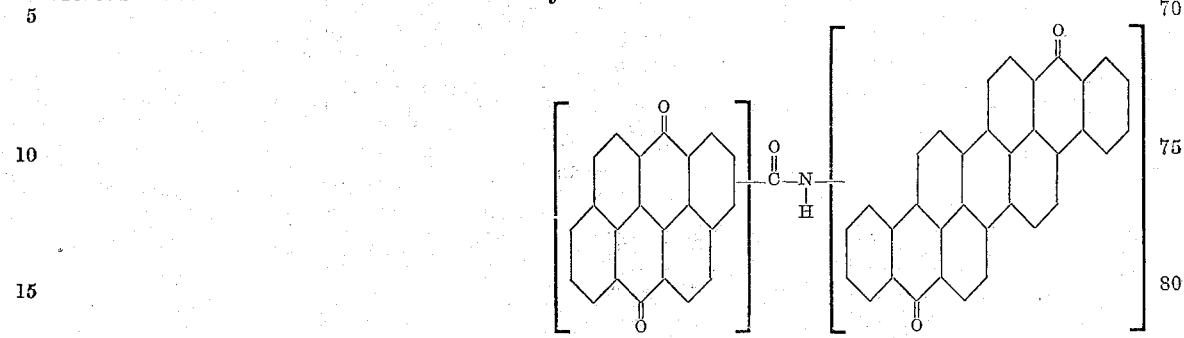

is a dark-blue powder dissolving in concentrated sulphuric acid with a green coloration and dyeing cotton from a violet vat dark-blue shades of excellent fastness.

What we claim is:

1. As new articles of manufacture, the new vat dyestuffs corresponding to the general formula

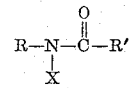

in which R represents a dibenzanthrone or isodibenzanthrone radicle, R'—CO— a radicle of a carboxylic acid of an aromatic compound containing a system of at least 3 condensed rings and capable of being vatted and X a hydrogen atom or a hydrocarbon radicle.

2. As new articles of manufacture, the new vat dyestuffs corresponding to the general formula

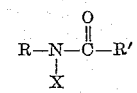

in which R represents a dibenzanthrone radicle, R'—CO— a radicle of an anthraquinonecarboxylic acid and X a hydrogen atom or a hydrocarbon radicle.

3. As a new article of manufacture, the new vat dyestuff corresponding to the general formula

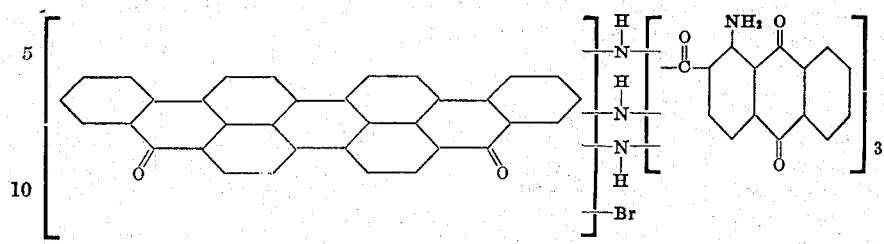

which is a bluish black powder dissolving in concentrated sulphuric acid with a violet coloration, and which dyes cotton from a bluish-green vat bluish-green shades of excellent fastness.

4. The process of producing new vat dyestuffs, which comprises condensing a halogenated dibenzanthrone with an amide of an anthroquinone carboxylic acid.

5. The process of producing new vat dyestuffs, which comprises condensing tetrabrom-dibenzanthrone with 1-amino-2-anthraquinone-carboxylic acid amide.

6. The process of producing new vat dyestuffs, which comprises condensing a halogenated compound selected from the group consisting a dibenzanthrones and isodibenzanthrones with a carboxylic acid amide of an aromatic compound containing a system of at least 3 condensed rings and being capable of being vatted.

7. The process of producing new vat dyestuffs, which comprises condensing a compound selected from the group consisting of halogen dibenzanthrones and halogen isodibenzanthrones with a carboxylic acid amide of an aromatic compound containing a system of at least 3 condensed rings and being capable of being vatted, the process being carried out in an inert organic medium of the aromatic series of high boiling point.

8. The process of producing new vat dyestuffs, which comprises condensing a compound selected from the group consisting of halogen dibenzanthrones and halogen isodibenzanthrones with a carboxylic acid amide of an aromatic compound containing a system of at least 3 condensed rings and being capable of being vatted, the process being carried out in an inert organic medium of the aromatic series of high boiling point and in the presence of a condensing catalyst.

In testimony whereof we have hereunto set our hands.

MAX ALBERT KUNZ.
KARL KOEBERLE.